(12) United States Patent
Sugiyama et al.

(10) Patent No.: US 11,511,620 B2
(45) Date of Patent: Nov. 29, 2022

(54) VENTILATION CONTROL VALVE FOR FUEL TANK

(71) Applicants: KYOSAN DENKI CO., LTD., Koga (JP); TOYOTA JIDOSHA KABUSHIKI KAISHA, Toyota (JP)

(72) Inventors: Akinari Sugiyama, Koga (JP); Yuusuke Mukasa, Iruma (JP); Takuya Tadokoro, Toyota (JP)

(73) Assignees: KYOSAN DENKI CO., LTD., Koga (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 38 days.

(21) Appl. No.: 16/922,760

(22) Filed: Jul. 7, 2020

(65) Prior Publication Data
US 2020/0331341 A1 Oct. 22, 2020

Related U.S. Application Data

(63) Continuation of application No. PCT/JP2018/041571, filed on Nov. 9, 2018.

(30) Foreign Application Priority Data

Jan. 19, 2018 (JP) .............................. JP2018-007008

(51) Int. Cl.
*B60K 15/035* (2006.01)
*F16K 31/22* (2006.01)
(Continued)

(52) U.S. Cl.
CPC ........ *B60K 15/03519* (2013.01); *F16K 17/36* (2013.01); *F16K 24/044* (2013.01);
(Continued)

(58) Field of Classification Search
CPC ........ F16K 17/36; F16K 31/22; F16K 24/042; F16K 24/044; Y10T 137/3099;
(Continued)

(56) References Cited

U.S. PATENT DOCUMENTS 6,371,152 B1 4/2002 Benjey
2006/0162777 A1* 7/2006 Takahashi ............. F16K 24/044
137/202

(Continued)

FOREIGN PATENT DOCUMENTS

JP 2001254650 A 9/2001
JP 2008248913 A 10/2008
(Continued)

*Primary Examiner* — Atif H Chaudry
(74) *Attorney, Agent, or Firm* — Harness, Dickey & Pierce, P.L.C.

(57) ABSTRACT

A ventilation control valve for a fuel tank is disposed in a ventilation passage which communicates an inside and an outside of a fuel tank. The ventilation control valve includes a float that floats on a liquid level of a fuel and moves up and down. The ventilation control valve includes a valve mechanism which switches a passage sectional area of the ventilation passage in conjunction with the float to an open state and a restricted state in which the passage sectional area is restricted from the opened state. The float has a volume chamber in which volume changes in accordance with a vertical movement of the float. A control gap as a flow rate adjusting mechanism is formed between the cylindrical wall of the float and the cylindrical wall of a case. Due to the control gap, the volume chamber functions as a damper.

16 Claims, 7 Drawing Sheets

(51) Int. Cl.
*F16K 24/04* (2006.01)
*F16K 17/36* (2006.01)
*B60K 15/03* (2006.01)

(52) U.S. Cl.
CPC .... *F16K 31/22* (2013.01); *B60K 2015/03217* (2013.01); *Y10T 137/0874* (2015.04); *Y10T 137/3099* (2015.04)

(58) Field of Classification Search
CPC ........ Y10T 137/0874; B60K 15/03519; B60K 2015/03217; B60K 2015/03566; B60K 15/035
See application file for complete search history.

(56) References Cited

U.S. PATENT DOCUMENTS

| | | |
|---|---|---|
| 2008/0251134 A1 | 10/2008 | Miura |
| 2010/0065134 A1 | 3/2010 | Miura |
| 2013/0075394 A1 | 3/2013 | Suzuki |
| 2014/0230920 A1 | 8/2014 | Shimokawa et al. |
| 2015/0034174 A1 | 2/2015 | Sui |
| 2016/0031315 A1 | 2/2016 | Suzuki |
| 2018/0194220 A1 | 7/2018 | Sugiyama et al. |

FOREIGN PATENT DOCUMENTS

| | | |
|---|---|---|
| JP | 2010095247 A | 4/2010 |
| JP | 2013082427 A | 5/2013 |
| JP | 2014159209 A | 9/2014 |
| JP | 2017043231 A | 3/2017 |
| JP | 2017-082808 A | 5/2017 |
| JP | 2018013087 A | 1/2018 |
| JP | 2018082808 A | 5/2018 |
| WO | WO-2013141220 A1 | 9/2013 |

* cited by examiner though the valve opens. The ventilation control valve for a fuel tank is useful.

VENTILATION CONTROL VALVE FOR FUEL TANK

CROSS REFERENCE TO RELATED APPLICATION

The present application is a continuation application of International Patent Application No. PCT/JP2018/041571 filed on Nov. 9, 2018, which designated the U.S. and claims the benefit of priority from Japanese Patent Application No. 2018-007008 filed in Japan filed on Jan. 19, 2018, the entire disclosure of the above application is incorporated herein by reference.

TECHNICAL FIELD

The disclosure in this specification relates to a ventilation control valve for a fuel tank.

BACKGROUND ART

A float valve is used for a refueling control valve which is one application. The refueling control valve is also called a full tank control valve for controlling a full tank (state in which the fuel has been supplied to an upper limit of the fuel tank). When a liquid level reaches the float, this device closes the passage by the float floating on the fuel. When the passage is closed, a liquid level in the filler pipe rises and an automatic cut function of a refueling gun is promoted.

SUMMARY

This disclosure provides a ventilation control valve for a fuel tank disposed in a ventilation passage communicating an inside and an outside of a fuel tank. A ventilation control valve for a fuel tank, comprising: a valve mechanism which has a float being capable of floating and moving up and down on a liquid level of a fuel, and which switches a passage cross sectional area of the ventilation passage in conjunction with the float into an open state and a restricted state in which the passage cross sectional area is restricted than the open state; a volume chamber in which volume changes in accordance with a vertical movement of the float; and a flow rate adjusting mechanism which sets an outflow of a fluid from an inside to an outside of the volume chamber in a first state, and which sets an inflow from the outside to the inside in a second state different from the first state, wherein the volume chamber includes: a fixed piston disposed on a case; and a movable cylinder disposed on the float and movably accommodating the fixed piston. The volume chamber includes a fixed piston disposed on the case and a movable cylinder disposed on the float and movably accommodating the fixed piston.

According to a disclosed ventilation control valve for a fuel tank, the volume chamber functions as a damper that regulates a valve closing motion and/or valve opening motion by the float. The flow rate adjusting mechanism sets the outflow of the fluid from the inside to the outside of the volume chamber into the first state and sets the inflow from the outside to the inside into the second state different from the first state. The volume chamber has a fixed piston disposed on the case and a movable cylinder disposed on the float and accommodating the fixed piston so as to be relatively movable. As a result, the volume chamber that functions as a damper that restricts the movement of the float is formed.

This disclosure provides a ventilation control valve for a fuel tank disposed in a ventilation passage communicating an inside and an outside of a fuel tank. A ventilation control valve for a fuel tank, comprising: a valve mechanism which has a float being capable of floating and moving up and down on a liquid level of a fuel, and which switches a passage cross sectional area of the ventilation passage in conjunction with the float into an open state and a restricted state in which the passage cross sectional area is restricted than the open state; a volume chamber in which volume changes in accordance with a vertical movement of the float; and a flow rate adjusting mechanism which sets an outflow of a fluid from an inside to an outside of the volume chamber in a first state, and which sets an inflow from the outside to the inside in a second state different from the first state, wherein a gas reservoir which stores gas; and a through hole which penetrates from the gas reservoir to the volume chamber and supplies the gas from the gas reservoir to the volume chamber.

According to a disclosed ventilation control valve for a fuel tank, the volume chamber functions as a damper that regulates a valve closing motion and/or valve opening motion by the float. The flow rate adjusting mechanism sets the outflow of the fluid from the inside to the outside of the volume chamber into the first state and sets the inflow from the outside to the inside into the second state different from the first state. Since the gas reservoir stores the gas, even if the liquid enters into an inside of the float, a buoyancy of the float is compensated by supplying the gas from the through hole. Therefore, a damper action is given to the valve opening motion without impairing the responsiveness of the valve closing motion.

This disclosure provides a ventilation control valve for a fuel tank disposed in a ventilation passage communicating an inside and an outside of a fuel tank. A ventilation control valve for a fuel tank, comprising: a valve mechanism which has a float being capable of floating and moving up and down on a liquid level of a fuel, and which switches a passage cross sectional area of the ventilation passage in conjunction with the float into an open state and a restricted state in which the passage cross sectional area is restricted than the open state; a volume chamber in which volume changes in accordance with a vertical movement of the float; and a flow rate adjusting mechanism which sets an outflow of a fluid from an inside to an outside of the volume chamber in a first state, and which sets an inflow from the outside to the inside in a second state different from the first state.

According to a disclosed ventilation control valve for a fuel tank, the ventilation passage is provided with a valve mechanism. The valve mechanism performs a valve opening motion and a valve closing motion. The valve mechanism is provided with a volume chamber and a flow rate adjusting mechanism. The float provides a valve closing motion and a valve opening motion by moving up and down. The volume chamber functions as a damper that regulates the movement of the float. Therefore, the volume chamber functions as a damper that regulates the valve closing motion and/or the valve opening motion of the float. The flow rate adjusting mechanism sets the flow of the fluid from the inside of the volume chamber to the outside to a first state and sets the flow from the outside to the inside to a second state different from the first state. For example, the flow rate adjusting mechanism adjusts the valve closing motion and/or the valve opening motion slower. When the valve closing motion is adjusted slower, the energy at the time of valve closing is suppressed. When the valve opening motion is adjusted slower, a stroke amount for valve opening can be suppressed without impairing the responsiveness of the valve closing motion, and the energy at the next valve closing is suppressed. As a result, it is possible to prevent an undesirable collision.

The disclosed aspects in this specification adopt different technical solutions from each other in order to achieve their respective objectives. Reference numerals in parentheses described in claims and this section exemplarily show corresponding relationships with parts of embodiments to be described later and are not intended to limit technical scopes. The objects, features, and advantages disclosed in this specification will become apparent by referring to following detailed descriptions and accompanying drawings.

DESCRIPTION

Figure 1:
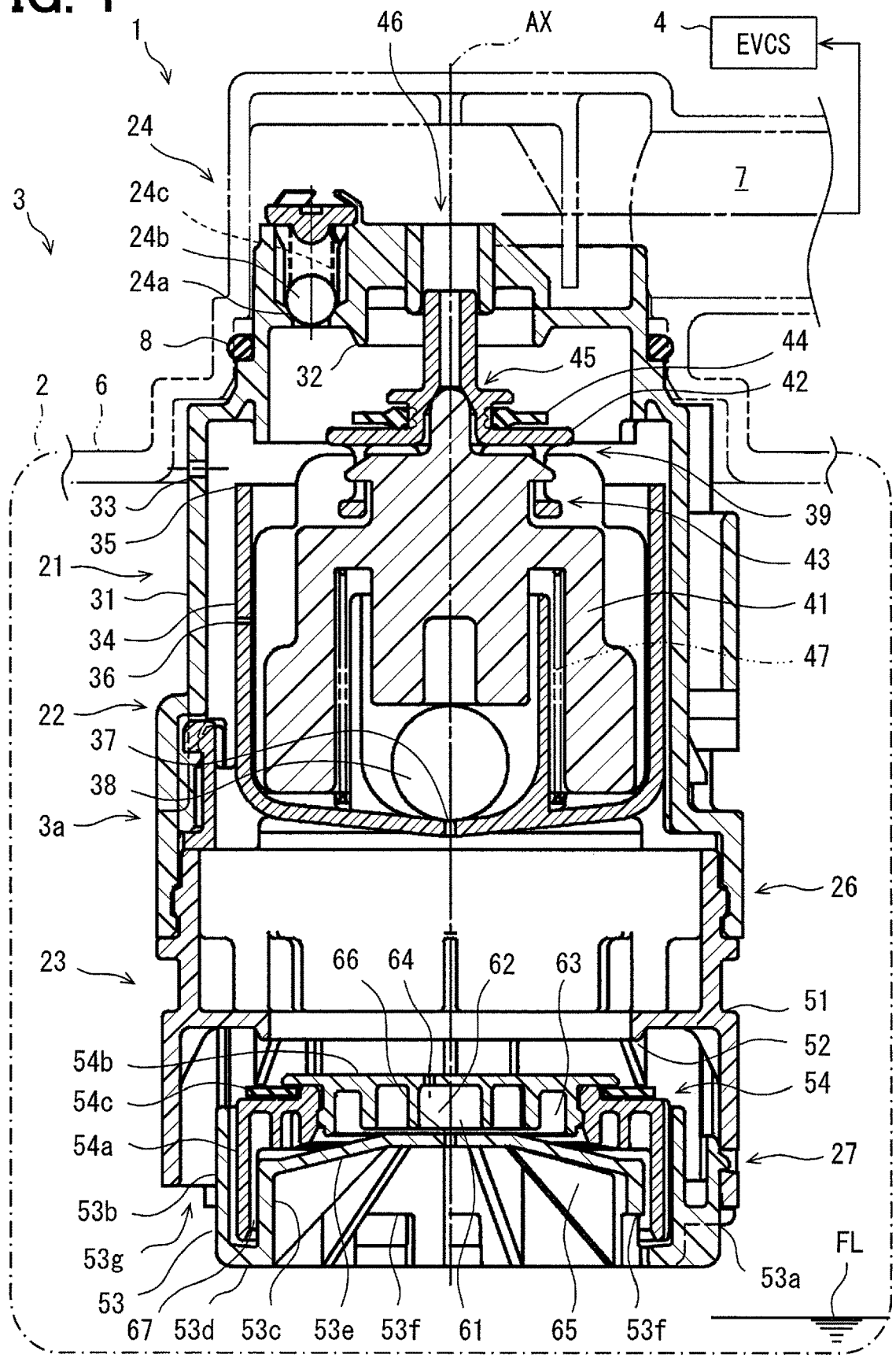
FIG. 1 is a cross sectional view showing a system according to a first embodiment.

Hereinafter, a plurality of embodiments will be described with reference to the drawings. In some embodiments, parts that are functionally and/or structurally corresponding and/or associated are given the same reference numerals, or reference numerals with different hundred digit or more digits. For corresponding parts and/or associated parts, reference can be made to the description of other embodiments.

First Embodiment

<System>
In FIG. 1, a storage device 1 for fuel includes a tank 2 for fuel, a refueling control valve 3, and a vapor treatment device (EVCS) 4. The storage device 1 is mounted on a vehicle. The storage device 1 provides a vehicle system. The storage device 1 can include a fuel supply device that supplies liquid fuel to an internal combustion engine mounted on the vehicle. The tank 2 is a container that stores liquid fuel. The fuel tank 2 has a complicated shape in order to provide a predetermined capacity while being mountable on the vehicle. In the following description, the term "fuel" refers to a liquid unless otherwise specified, and the term "gas" refers to a mixed gas of air and fuel vapor in the tank 2.

The refueling control valve 3 is provided in the tank 2. The refueling control valve 3 provides a ventilation control valve for a fuel tank. The refueling control valve 3 may be disposed on a fuel supply device provided in the tank 2, for example, a pump module. The refueling control valve 3 provides a float valve for a tank. The refueling control valve 3 is disposed in a ventilation path for ventilation between the tank 2 and the vapor treatment device 4. The air passage is used to discharge the gas from the tank 2 to the vapor treatment device 4. The air passage is also called a ventilation passage or a breathing passage. The refueling control valve 3 opens and closes the air passage. The refueling control valve 3 is disposed on an upper wall surface of the tank 2.

The refueling control valve 3 allows refueling from a fuel filler port by allowing ventilation between the tank 2 and the vapor treatment device 4. The refueling control valve 3 prompts stop of the refueling from the fuel filler port by blocking the ventilation between the tank 2 and the vapor treatment device 4. When the refueling control valve 3 shuts off ventilation, the liquid level of the fuel rises toward the fuel filler port. As a result, an auto cut mechanism (also referred to as an automatic stop mechanism) of the refueling gun reacts and refueling from the refueling gun is automatically stopped.

The vapor treatment device 4 includes a canister that captures fuel vapor (vapor) contained in the gas discharged from the tank 2. The vapor treatment device 4 includes a purge mechanism. When a predetermined condition is satisfied, the purge mechanism processes the fuel vapor by supplying the fuel vapor captured by the canister to the internal combustion engine for combustion.

<Refueling Control Valve>
The refueling control valve 3 is attached to a flange 6 provided at an upper part of the tank 2. The flange 6 is made of resin or metal. The flange 6 is a member that covers the opening of the tank 2. The flange 6 can be provided by a member dedicated for attaching the refueling control valve 3 or a member for attaching other fuel tank accessory parts. The refueling control valve 3 is disposed in the tank 2 via the flange 6. The refueling control valve 3 is suspended from the flange 6 into the tank 2. The flange 6 defines a passage 7 between the tank 2 and the vapor treatment device 4. The refueling control valve 3 and the flange 6 are connected by a connecting mechanism such as a snap fit mechanism. A seal member 8 is disposed between the refueling control valve 3 and the flange 6. The refueling control valve 3 is installed so as to be on an illustrated position when the vehicle is in a horizontal state, i.e., when the tank 2 is placed in a horizontal state.

The refueling control valve 3 has a cylindrical appearance extending downward from the upper part of the tank 2. The refueling control valve 3 provides a tubular pipe 3a defined and formed by the members 31, 34, 51, 53 as a case. When the fuel level reaches the upper end of the tank 2, the pipe 3a enables the fuel liquid level rises in the pipe 3a while securing an air space outside the pipe 3a (upper part of the tank 2). The pipe 3a may also be referred to as a siphon pipe or an air chamber forming pipe. The upper end of the pipe 3a communicates with the passage 7, and the lower end is opened slightly below the upper end of the tank 2. The pipe 3a is suspended from the upper part of the tank 2 and forms an air passage. The refueling control valve 3 opens and closes a communication state between the tank 2 and the passage 7 in response to the liquid level of the fuel in the pipe 3a, i.e., opens and closes the air passage.

The cases 31, 34, 51, and 53 form a ventilation passage that communicates the inside and the outside of the tank 2. The cases 31, 34, 51, 53 have openings 53f, 53g for introducing fuel to the lower part. The cases 31, 34, 51, 53 are cylindrical so as to form an air chamber in the tank 2 even if fuel is introduced into the case.

The refueling control valve 3 has a main float valve 21, a fuel container 22, a sub float valve 23, and a relief valve 24.

<Main Float Valve>

The main float valve 21 is arranged in the pipe 3a. The main float valve 21 opens the air passage when there is no fuel in the pipe 3a. The main float valve 21 floats on the fuel that reaches the inside of the pipe 3a and closes the air passage. The main float valve 21 opens and closes the air passage in response to the fuel liquid surface (first liquid surface height) at a relatively upper portion of the pipe 3a.

The fuel container 22 provides a fuel reservoir for adjusting a response of the main float valve 21. The fuel container 22 is also a responsivity adjustment mechanism for preventing frequent opening and closing such that the main float valve 21 is opened again in a short period of time after the main float valve 21 is once closed. The fuel container 22 maintains the main float valve 21 in a closed state for a period in which it is assumed that a refueling operator will recognize the tank 2 is full and will finish the refueling operation.

<Sub Float Valve>

The sub float valve 23 controls an arrival of the fuel to the main float valve 21. The sub float valve 23 prevents the fuel from reaching the main float valve 21 even if the temporary fuel level rises. On the other hand, the sub float valve 23 permits the fuel to reach the main float valve 21 when the fuel level continually rises. The sub float valve 23 is disposed closer to the tank 2 side of the pipe 3a than the main float valve 21. The sub float valve 23 is arranged at a lower part of the pipe 3a, i.e., near the inlet. The sub float valve 23 opens the air passage when there is no fuel in the pipe 3a. The sub float valve 23 floats on the fuel that has reached the inside of the pipe 3a and closes the air passage. As a result, the sub float valve 23 limits the arrival of the fuel to the main float valve 21. The sub float valve 23 opens and closes the passage in the pipe 3a, i.e., the air passage between the inlet of the pipe 3a and the main float valve 21 in response to the fuel liquid surface at the inlet of the pipe 3a.

<Relief Valve>

The relief valve 24 suppresses the pressure in the tank 2. The relief valve 24 is disposed at the uppermost part of the refueling control valve 3, in other words, at the uppermost part of the pipe 3a. The relief valve 24 is disposed on the upper wall of the first case 31. The relief valve 24 includes a valve seat 24a, a float 24b, and a spring 24c. The relief pressure is set by the float 24b and the spring 24c. The relief valve 24 opens when the pressure in the tank 2 becomes excessively high, and discharges the gas in the tank 2 to the passage 7.

<First Case>

The main float valve 21 has a first case 31. The first case 31 is a cylindrical shape. An upper end of the first case 31 is connected to the flange 6. An opening for communicating the inside of the tank 2 and the passage 7 is disposed at the upper end of the first case 31. This opening is surrounded and partitioned by a first valve seat 32. An opening end communicating with the tank 2 is disposed at a lower end of the first case 31. A sub float valve 23 is provided at the lower end of the first case 31. The lower end of the first case 31 is opened and closed by the sub float valve 23. A through hole 33 is disposed at a predetermined position on the top of the first case 31. The through hole 33 communicates the inside and outside of the first case 31. The through hole 33 enables the fuel to be discharged from the upper part of the first case 31 and/or the air to be supplied to the upper part of the first case 31.

<Inner Cup>

The main float valve 21 and the fuel container 22 have an inner cup 34. The inner cup 34 is accommodated in the first case 31. The inner cup 34 has a cup shape capable of storing fuel. The inner cup 34 defines a fuel reservoir in the first case 31. An upper end opening 35 of the fuel reservoir provided by the inner cup 34 is located at substantially the same height as the through hole 33. The inner cup 34 is formed so as to introduce and accumulate the fuel from the upper end opening 35. The inner cup 34 is held by being sandwiched between the first case 31 and a second case 51 described later.

The inner cup 34 has a through hole 36 disposed on the side wall and a through hole 37 disposed on the bottom wall. The through hole 36 allows the fuel to be discharged from the fuel reservoir in the inner cup 34. The through hole 36 slowly discharges the fuel. The through hole 36 is set to be small so as to cause the fuel to slowly leaking over a relatively long period of time, which is predicted that the operator of the refueling gun will give up a supplemental refueling. The bottom wall of the inner cup 34 is formed so as to provide a funnel shaped bottom surface therein. The through hole 37 opens at the lowest position of the bottom wall. The through hole 37 is formed to be relatively large so that the fuel is discharged rapidly. The inner cup 34 provides a member that forms a fuel sump for accumulating fuel in order to maintain the main float valve 21 in a closed state.

<Ball>

The fuel container 22 has a ball 38. The ball 38 can close the through hole 37. In addition, the ball 38 can open the through hole 37 by rolling while sensing a rolling. Instead of the ball 38, various members such as a roller and a thin piece for sensing the rolling can be used. The inner cup 34 and the ball 38 provide the fuel container 22. The inner cup 34 and the ball 38 provide a discharge valve for discharging the fuel in the inner cup 34 during the period after the refueling operation is completed. The ball 38 moves by rolling upon sensing the shaking of the tank 2, that is, the shaking accompanying the traveling of the vehicle. The through holes 36, 37 and the ball 38 provide a discharge mechanism for discharging fuel from the fuel reservoir provided by the inner cup 34. The discharge mechanism holds the fuel so as to prevent excessive refueling in a single refueling operation, but enables refueling again after the refueling operation is completed. The through hole 37 and the ball 38 provide a mechanism which determines a completion of the single refueling operation and discharges the fuel.

<Float of Main Float Valve>

The main float valve 21 has a movable valve body 39. The movable valve body 39 is a float for the main float valve 21. The movable valve element 39 is accommodated in the first case 31. The movable valve body 39 is accommodated in the inner cup 34. The movable valve body 39 is accommodated so as to be movable in the first case 31 and the inner cup 34 in the axial direction, i.e., along the vertical direction.

The movable valve body 39 is structured so as to float on the fuel when there is the fuel in the inner cup 34. The movable valve body 39 has a float 41. The float 41 is accommodated in the inner cup 34. The movable valve body 39 has a holder 42. The holder 42 is arranged on the float 41. The holder 42 is connected to the float 41 via a coupling mechanism 43. The coupling mechanism 43 is provided by a protrusion disposed on the float 41, and a hook part disposed on the holder 42. The hook part has an elongated slot in the height direction for receiving the protrusion. A certain amount of play is permitted by movement of the protrusion in the slot of the hook part. The coupling mechanism 43 connects the float 41 and the holder 42 so that the float 41 and the holder 42 can be separated by a predetermined amount in the axial direction.

The holder 42 holds a seal member 44. The seal member 44 is an annular plate. The seal member 44 is tightly fitted on a cylindrical portion of the holder 42. The holder 42 and the seal member 44 block communication between the fuel tank 2 and the passage 7 when the movable valve body 39 is seated on the valve seat 32, i.e., when the seal member 44 is seated on the valve seat 32. When the seal member 44 is seated on the valve seat 32, a closed state of the main float valve 21 is provided. When the seal member 44 is separated from the valve seat 32, an open state of the main float valve 21 is provided.

A pilot valve 45 for assisting opening of the main float valve 21 is formed between the float 41 and the holder 42. The float 41 has a hemispherical protrusion. The holder 42 has a seat surface for receiving the protrusion. The pilot valve 45 is opened and closed by a play provided by the coupling mechanism 43. When the seal member 44 is seated on the valve seat 32, the pressure in the tank 2 becomes higher than the passage 7. When the float 41 descends due to lowering of the fuel level, the coupling mechanism 43 allows the float 41 to be separated from the holder 42. As a result, the pilot valve 45 opens. When the pilot valve 45 opens, the pressure difference between the front and the rear of the seal member 44 is relaxed, and the seal member 44 becomes easy to be separated from the valve seat 32.

The float 41 is guided in the inner cup 34 in the vertical direction, i.e., in the axial direction. The inner cup 34 provides an inner cylinder and an outer cylinder for guiding the float 41. Furthermore, a guide mechanism 46 is disposed between the holder 42 and the first case 31. The guide mechanism 46 is provided by a small diameter cylindrical portion disposed on the holder 42 and a large diameter cylindrical portion disposed on the first case 31. By disposing the small diameter cylindrical portion in the large diameter cylindrical portion, the holder 42 is guided so as to be movable in the axial direction without being displaced in the radial direction. A spring 47 in a compressed state is disposed between the inner cup 34 and the float 41. The spring 47 urges the movable valve body 39 upward. The spring 47 compensates a buoyancy of the movable valve body 39.

The first case 31, the inner cup 34, the float 41, and the holder 42 are made of resin. The ball 38 is made of resin. The seal member 44 is made of rubber.

<Second Case>

The sub float valve 23 has a second case 51. The second case 51 is a cylindrical shape. The second case 51 is attached to a lower end opening of the first case 31. The first case 31 and the second case 51 are connected. In this embodiment, the first case 31 and the second case 51 are connected by a connecting mechanism 26. The connecting mechanism 26 is provided by an engagement mechanism utilizing elastic deformation between the first case 31 and the second case 51. The connecting mechanism 26 is also called a snap fit.

<Third Case>

The sub float valve 23 has a third case 53. The third case 53 has a shallow dish shape. The third case 53 is attached to a lower end opening of the second case 51. The second case 51 and the third case 53 are connected by a connecting mechanism 27. The connecting mechanism 27 is provided by an engagement mechanism utilizing elastic deformation between the second case 51 and the third case 53. The connecting mechanism 27 is also called a snap fit.

The third case 53 forms an accommodation chamber for the float 54 between the second case 51 and the third case 53 while forming an opening at the lower end of the second case 51. The accommodation chamber communicates with the tank 2 through a plurality of large openings at the lower end. Therefore, the fuel in the tank 2 can freely enter the room defined by at least the second case 51 and the third case 53.

The third case 53 provides a guide portion that guides the float 54. The third case 53 has a shape that can be called a dish shape. The third case 53 has a plurality of elastic engagement pieces 53a on the radially outer side. These elastic engagement pieces 53a are connected to the lower end portion of the second case 51.

The third case 53 has an outer cylinder 53b for accommodating the float 54. The outer cylinder 53b is a circular cylindrical shape. The inner diameter of the outer cylinder 53b is larger than the outer diameter of the float 54 in order to accommodate the float 54. A sufficiently large gap is formed between the outer cylinder 53b and the float 54 to allow the liquid fuel and the gas to pass therethrough.

The third case 53 has an inner cylinder 53c. The inner cylinder 53c is a circular cylindrical shape. An outer diameter of the inner cylinder 53c is smaller than an inner diameter of the float 54 in order to be inserted into the float 54. A control gap 67 described later is formed between the inner cylinder 53c and the float 54.

The third case 53 has a bottom wall 53d. The bottom wall 53d connects the lower end of the outer cylinder 53b and the lower end of the inner cylinder 53c. The bottom wall 53d is an annular shape. The bottom wall 53d may come into contact with the lower end of the float 54.

The third case 53 has a partition wall 53e. The partition wall 53e is a wall that extends so as to cross the inner cylinder 53c. The partition wall 53e is also an end wall located at the end of the inner cylinder 53c. The cap shaped member formed by the inner cylinder 53c and the partition wall 53e provides the fixed piston disposed on the case. The fixed piston is movable relative to a movable cylinder described later.

The partition wall 53e provides a wall which is convex upwardly at a center portion. The partition wall 53e allows the fuel to flow toward an outer edge in the radial direction. The partition wall 53e pours the fuel into a control gap 67 described later. Thereby, the flow rate of air passing through the control gap 67 is suppressed.

The partition wall 53e may come into contact with the float 54 in the internal cavity of the float 54. A plurality of radially arranged ribs are disposed between the inner cylinder 53c and the partition wall 53e. The plurality of ribs are triangles having a side extending along the inner cylinder 53c and a side extending along the partition wall 53e.

The third case 53 has a plurality of openings as described above. These openings allow incoming flow of the fuel around the float 54. The third case 53 has a plurality of openings 53f. The opening 53f extends from the lower part of the inner cylinder 52c to the bottom wall 53d. The fuel can enter the outer cylinder 53b through the opening 53f. The third case 53 has a plurality of openings 53g. The opening 53g extends between the second case 51 and the outer cylinder 52b. The opening 53g extends between a plurality of elastic engagement portions 53a. The fuel can enter the inside through the opening 53g and overflow the upper end of the outer cylinder 53b. The fuel can be introduced from the opening 53f before the liquid level FL overflows the upper end of the outer cylinder 53b. Thereby, when the liquid level rises, it is possible to make the float 54 being responsive quickly.

<Float of Sub Float Valve>

The sub float valve 23 is disposed in the ventilation passage which communicates the inside and the outside of the tank 2. The sub float valve 23 provides a valve mechanism. The valve mechanism has a float 54 that floats and moves up and down on the fuel level FL. The valve mechanism switches a passage cross sectional area of the ventilation passage in conjunction with the float 54 in an open state and a restricted state (valve closed state) in which the passage cross sectional area is restricted more than the open state (valve open state). The float 54 is also called a movable valve body. The float 54 has a flat and circular cylindrical shape. The float 54 is also a flat cap shape. The float 54 can define a cavity in which the gas can be temporarily or permanently stored when submerged. The float 54 is accommodated between the second case 51 and the third case 53.

The second case 51 has a second valve seat 52 for the sub float valve 23. The second valve seat 52 is formed to face the float 54. The second valve seat 52 is positioned on an upstream side of the first valve seat 32 with respect to the air flow direction in the refueling control valve 3. In other words, the second valve seat 52 is installed on an inner side of the tank 2 than the first valve seat 32. The opening formed by the second valve seat 52 is larger than the opening formed by the first valve seat 32. The float 54 is seated on or separated from the second valve seat 52 by floating on the fuel in the tank 2.

The float 54 includes a first member 54a and a second member 54b. The first member 54a provides a cylindrical outer wall of the float 54. The first member 54a provides a movable cylinder. The first member 54a, i.e., a movable cylinder, is disposed on the float 54, and accommodates a fixed piston so that a relative movement is possible. The first member 54a may also be called an outer member or a ring member. The first member 54a is a circular cylindrical shape. The first member 54a has a cap shape having a lower end opening at the lower end. The first member 54a has a through hole at an upper wall. The through hole 63 opens at an opening surrounded by the second valve seat 52.

The second member 54b provides a central part of the float 54. The second member 54b may also be called a center member or a cap member. The second member 54b is a circular disk shape. The second member 54b is disposed so as to close the central through hole of the first member 54a.

The first member 54a and the second member 54b are made of resin. The first member 54a and the second member 54b may be connected by various connection methods such as press fitting, adhesion, and welding. The first member 54a and the second member 54b are connected by a snap fit utilizing an elasticity of resin.

The float 54 has a seal member 54c. The seal member 54c is disposed on the upper surface of the float 54. The seal member 54c is fixed between the first member 54a and the second member 54b which are forming members. The seal member 54c is seated or separated from the second valve seat 52. When the float 54 moves upward due to floating on the fuel, the seal member 54c is seated on the second valve seat 52. The seal member 54c closes the air passage by being seated on the second valve seat 52. When the float 54 sinks in the fuel or moves downward due to descending fuel level, the seal member 54c is separated from the second valve seat 52. The seal member 54c opens the air passage by being separated from the second valve seat 52. The float 54 is restricted from moving in the radial direction by the third case 53. The float 54 is guided by the third case 53 so as to move in the vertical direction, that is, in the axial direction.

<Volume Chamber of Sub Float Valve>

The float 54 and the third case 53 define and form a volume chamber 61 therebetween. The volume chamber 61 may be also called a float chamber. A volume of the volume chamber 61 is variable according to the position of the float 54. The volume of the volume chamber 61 changes depending on the vertical movement of the float 54. When the float 54 is located at the lowest position (the valve opening position), the volume of the volume chamber 61 is the smallest. When the float 54 is located at the highest position (valve closing position), the volume of the volume chamber 61 is the maximum. The volume chamber 61 may be also called a volume chamber. The volume chamber 61 is filled with the fuel and/or the gas. The ratio of the fuel and the gas in the volume chamber 61 adjusts the buoyancy of the float 54.

The volume chamber 61 includes a dual chamber 62 and a gas chamber 63. The dual chamber 62 may be filled with the fuel and/or the gas. The gas chamber 63 is closed upward and is open only downward. The gas chamber 63 is provided mainly for a purpose of storing the gas. The float 54 can float on the fuel by the buoyancy of the gas accumulated in the volume chamber 61. The volume chamber 61 provides a buoyancy chamber for floating the float 54 on the fuel when the fuel reaches the float 54.

The dual chamber 62 is disposed at a center in the radial direction of the float 54. The dual chamber 62 is disposed so as to occupy the central portion in the radial direction of the float 54. The dual chamber 62 is disposed on the top of the float 54.

The dual chamber 62 provides a buoyancy reducing element for gradually reducing the buoyancy applied to the float 54 as time passes after the fuel reaches the float 54. The float 54 has a through hole 64. The through hole 64 provides a buoyancy reducing element which gradually reduces the buoyancy of the float 54. The through hole 64 allows air to be extracted from the dual chamber 62 and allows the fuel to be introduced from the lower portion of the dual chamber 62. As a result, the buoyancy reducing element makes the float 54 gradually sinks into the fuel. The through hole 64 provides an element which adjusts the buoyancy of the float 54 after the sub float valve 23 is submerged below the liquid level FL. Due to the through hole 64, the sub float valve 23 is easily opened after being submerged, or shifts to the valve open state.

The gas chamber 63 is disposed outside the float 54 in the radial direction. The gas chamber 63 is disposed so as to surround at least a part of the dual chamber 62. The gas chamber 63 is arranged in an annular shape. The gas chamber 63 is annularly arranged along the second valve seat 52. The gas chamber 63 does not include a buoyancy reducing element similar to the through hole 64. The gas chamber 63 has a plurality of small rooms. The plurality of small rooms are dispersedly arranged along the radial direction. In other words, the plurality of annular small rooms are arranged concentrically. Each of the plurality of small rooms can store air independently. The gas chamber 63 may be partitioned into a plurality of small rooms arranged in a distributed manner along a circumferential direction.

<Damper Mechanism of Sub Float Valve>

A damper mechanism is formed between the float 54 and the third case 53. The damper mechanism is provided by a volume chamber 61 formed between the float 54 and the third case 53, and a flow rate adjusting mechanism which controls a flow of a fluid (including the fuel as a liquid and the gas) between the volume chamber 61 and an outside. In this embodiment, the flow rate adjusting mechanism is provided by the through hole 64, the through hole 66, and the control gap 67. The through hole 64 and the through hole 66 provide a relief port for mainly flowing the gas. The control gap 67 is disposed between a first member 54a as a cylindrical wall disposed on the float 54 and an inner wall 53c as a cylindrical wall disposed on the third case 53.

The control gap 67 demonstrates a small resistance to the gas flow and demonstrates a large resistance to the fuel flow. In this embodiment, the inflow of the fuel into the volume chamber 61 and the outflow of the fuel from the volume chamber 61 are controlled by forming the control gap 67 which is narrow to an extent to restrict the fuel flow. The control gap 67 limits the outflow of the fuel from the inside to the outside of the volume chamber 61 lesser than the outflow of the gas from the inside to the outside of the volume chamber 61.

The flow rate adjusting mechanism sets an outflow of the fluid from the inside to the outside of the volume chamber 61 into a first state, and sets an inflow from the outside to the inside into the second state different from the first state. For example, the first state is a blocking state, i.e., a closed state. For example, the second state is a permitting state, i.e., an open state. The first state is provided by, for example, a flow path resistance in the control gap 67 when there is the fuel in the control gap 67. The second state is provided by, for example, a flow path resistance when there is no fuel in the control gap 67. Further, the second state is provided by supplying the gas from a gas reservoir 65 described later. This is because a floating speed of the float 54 is increased by supplying the gas from the gas reservoir.

In this embodiment, a phase difference is provided between the fluctuation of the liquid level FL outside the refueling control valve 3 and the fluctuation of the float 54. The damper mechanism gives delay to a motion from the valve closing state to the valve opening state by limiting a discharge of the fuel from the volume chamber 61. The damper mechanism deliberately lowers the responsiveness of the float 54 as a float. Thereby, the sensitive opening and closing of the sub float valve 23 is suppressed. Further, a sound generated from the sub float valve 23 is suppressed.

<Gas Reservoir of Sub Float Valve>

Further, the third case 53 defines and forms a gas reservoir 65 by the inner cylinder 53c and the partition wall 53e. The gas reservoir 65 is greatly opened downward and does not accumulate the fuel. The gas reservoir 65 stores the gas below the liquid level FL. The gas reservoir 65 is partitioned above an upper edge of the opening 53f.

The partition wall 53e has a through hole 66. The through hole 66 is opened at a lower portion of the dual chamber 62 where the through hole 64 opens. The position of the through hole 66 is deviated from the position of the through hole 64 with respect to the direction of the axis AX.

The through hole 66 communicates from the gas reservoir 65 to the volume chamber 66. The through hole 66 supplies the gas from the gas reservoir 65 to the volume chamber 61. The size and length of the through hole 66 are set so as to adjust the gas supply speed. When the liquid level FL rises rapidly and the float 54 is about to float, the volume chamber 61 sucks up the gas from the through hole 66. At this time, the volume chamber 61 tries to suck up the fuel from the control gap 67, but since the fuel demonstrates a higher resistance than the gas, the volume chamber 61 sucks up the gas from the through hole 66. By supplying the gas from the gas reservoir 65 through the through hole 66, a floating speed of the float 54 is increased as compared with a floating speed obtained only by the control gap 67. Thereby, even if the control gap 67 is provided between the float 54 and the inner cylinder 53c, it is possible to obtain the responsiveness in closing the valve required when the liquid level FL rises.

In another aspect, the through hole 66 adjusts the rising speed of the float 54. The through hole 66 suppresses the rising speed of the float 54, for example. Therefore, even when the liquid level FL rises rapidly, an impact when the float 54 is seated on the second valve seat 52 is suppressed.

<Behavior of Sub Float Valve>

FIGS. 2 to 11 are sectional views showing the sub float valve 23 as a model. With reference to FIGS. 2 to 11, a behavior of the sub float valve 23 with respect to the fluctuation of the liquid level FL will be described.

Figure 2:
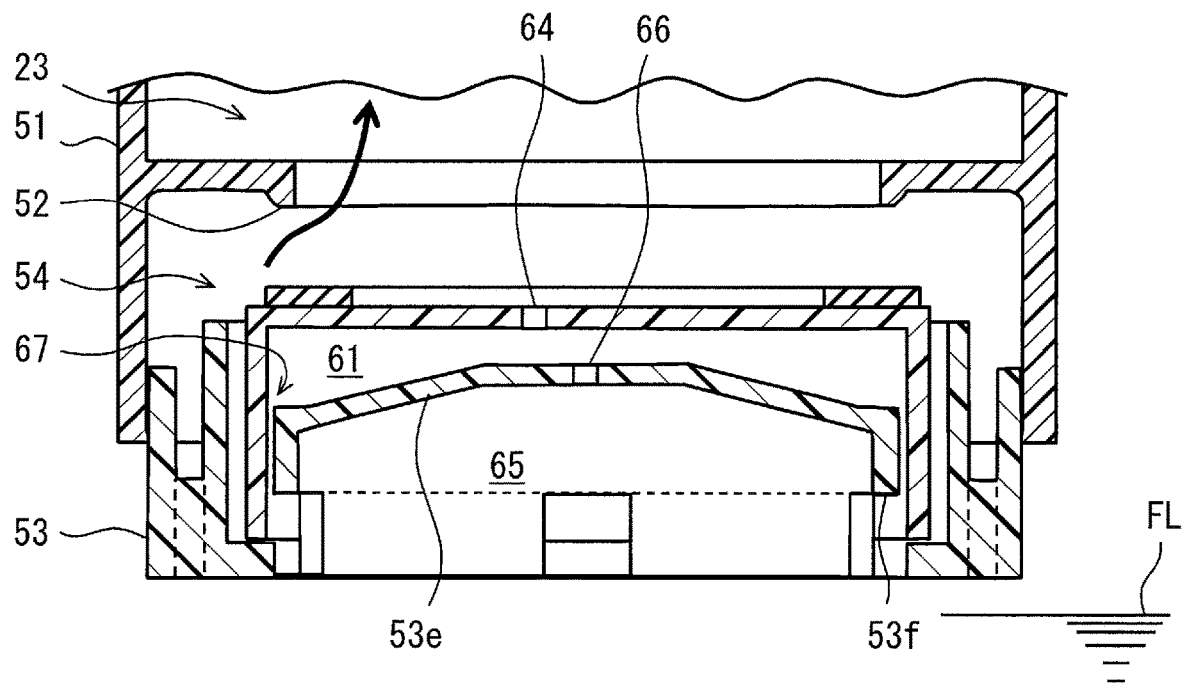
FIG. 2 is a cross sectional view showing a behavior of a valve with respect to a change in liquid level.

FIG. 2 shows a state where the liquid level FL is sufficiently lower than the sub float valve 23. The float 54 is located at the lowest position due to its own weight. The sub float valve 23 is in a valve open state.

Figure 3:
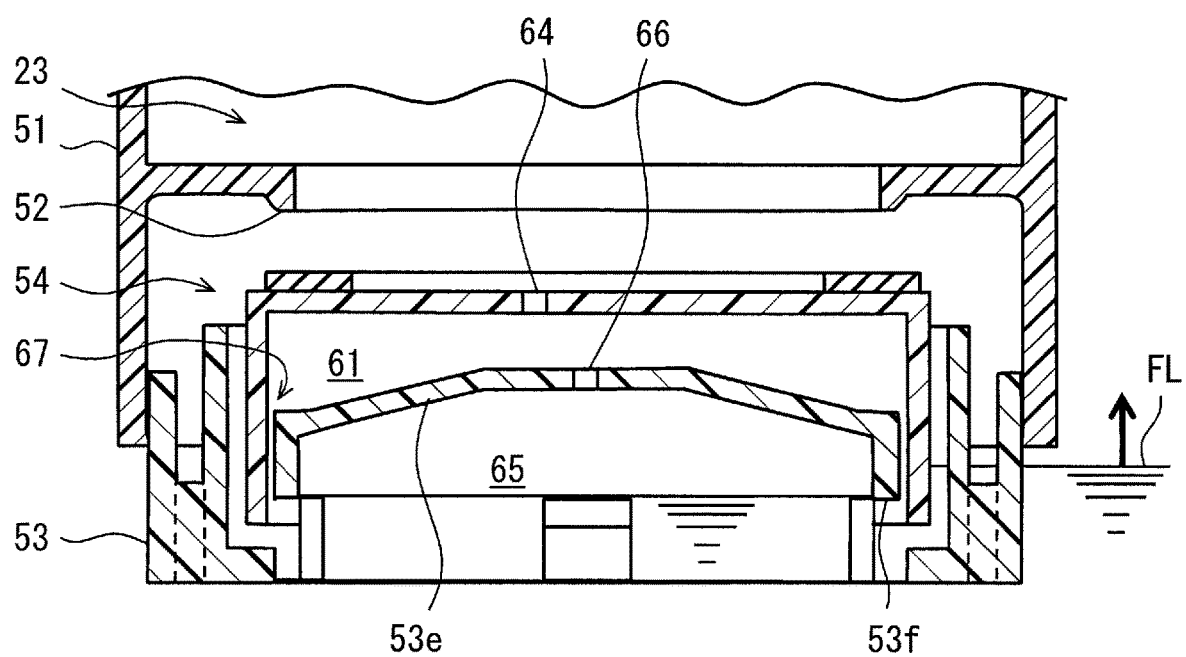
FIG. 3 is a cross sectional view showing a behavior of a valve with respect to a change in liquid level.

FIG. 3 shows a state where the liquid level FL has reached the lower part of the float 54. An arrow symbol of the liquid level FL indicates that the liquid level FL is in a rising process. The float 54 is located at the lowest position due to its own weight or slightly starts to float. The gas reservoir 65 is about to store the gas.

Figure 4:
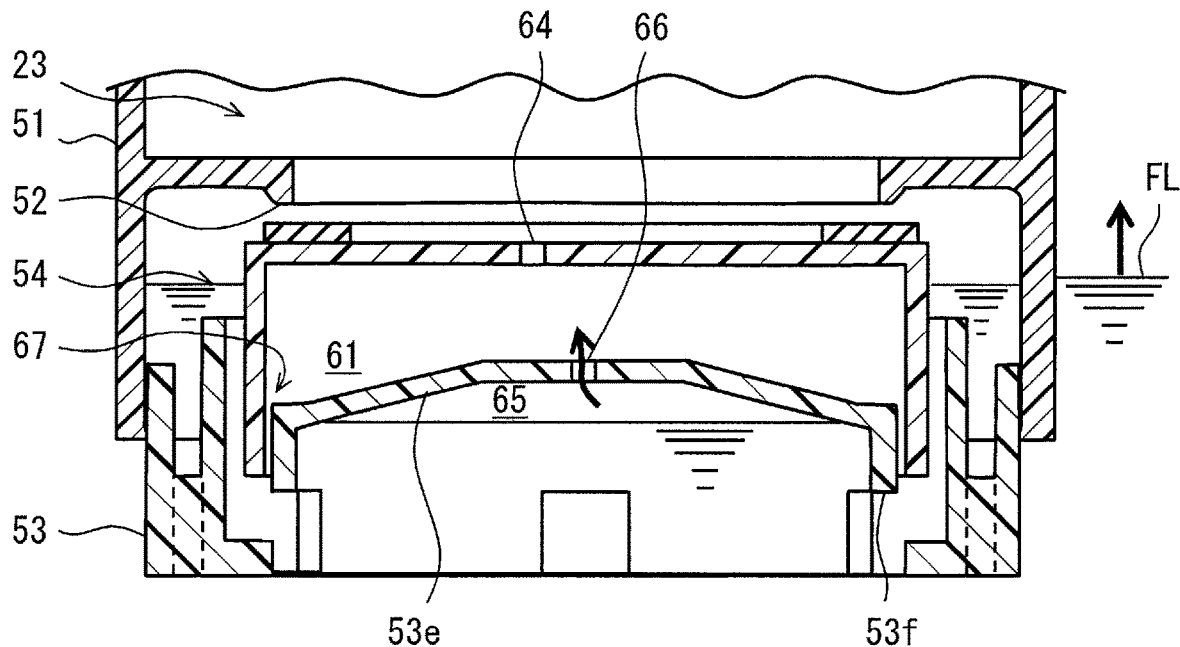
FIG. 4 is a cross sectional view showing a behavior of a valve with respect to a change in liquid level.

FIG. 4 shows a state in which the liquid level FL causes the float 54 to float. The float 54 is completely floating on the liquid level FL. At this time, the fuel is difficult to pass through the control gap 67 due to a viscosity and a surface tension. The gas stored in the gas reservoir 65 is gradually supplied to the volume chamber 61. As a result, the fuel gradually enters the gas reservoir 65.

Figure 5:
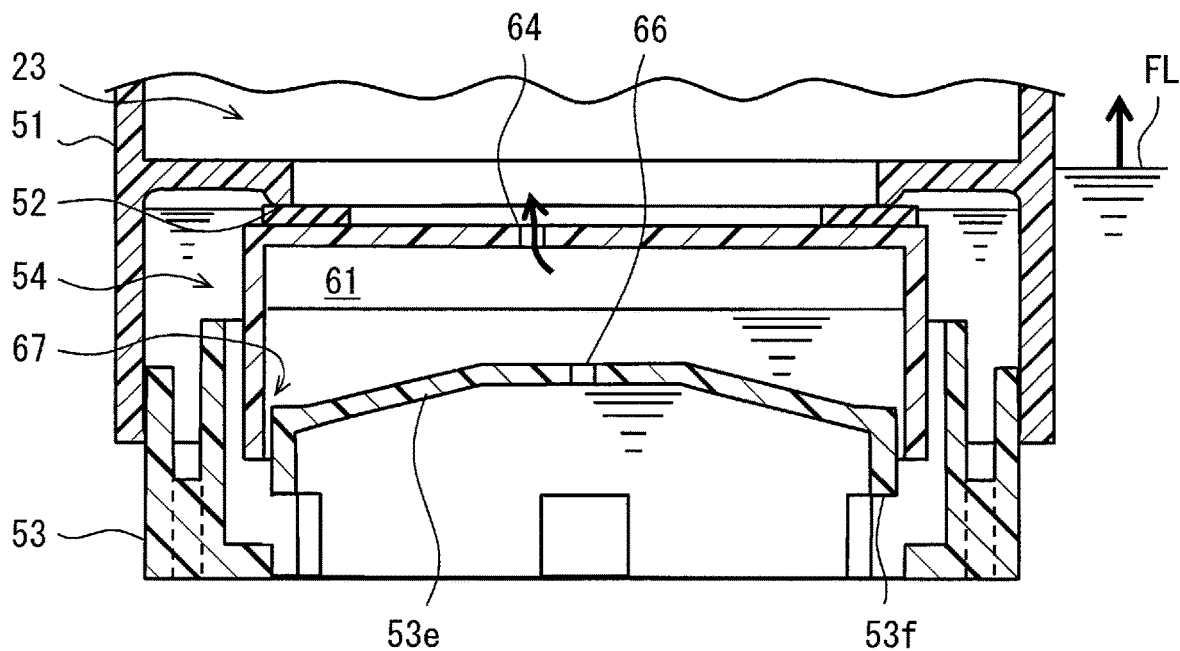
FIG. 5 is a cross sectional view showing a behavior of a valve with respect to a change in liquid level.

FIG. 5 shows a state immediately after the liquid level FL has risen to close the sub float valve 23. The float 54 is seated on the second valve seat 52. Therefore, the sub float valve 23 is in the closed state. The gas in the gas reservoir 65 has completely moved from the through hole 66 to the volume chamber 61. The gas in the volume chamber 61 gradually flows out from the through hole 64. As a result, the volume chamber 61 is filled with the fuel.

When the sub float valve 23 is submerged under the liquid level FL for a long time, it loses buoyancy for maintaining the valve closed state. Eventually, when the dual chamber 62 is filled with the fuel, the float 54 sinks. As a result, the sub float valve 23 is opened.

Figure 6:
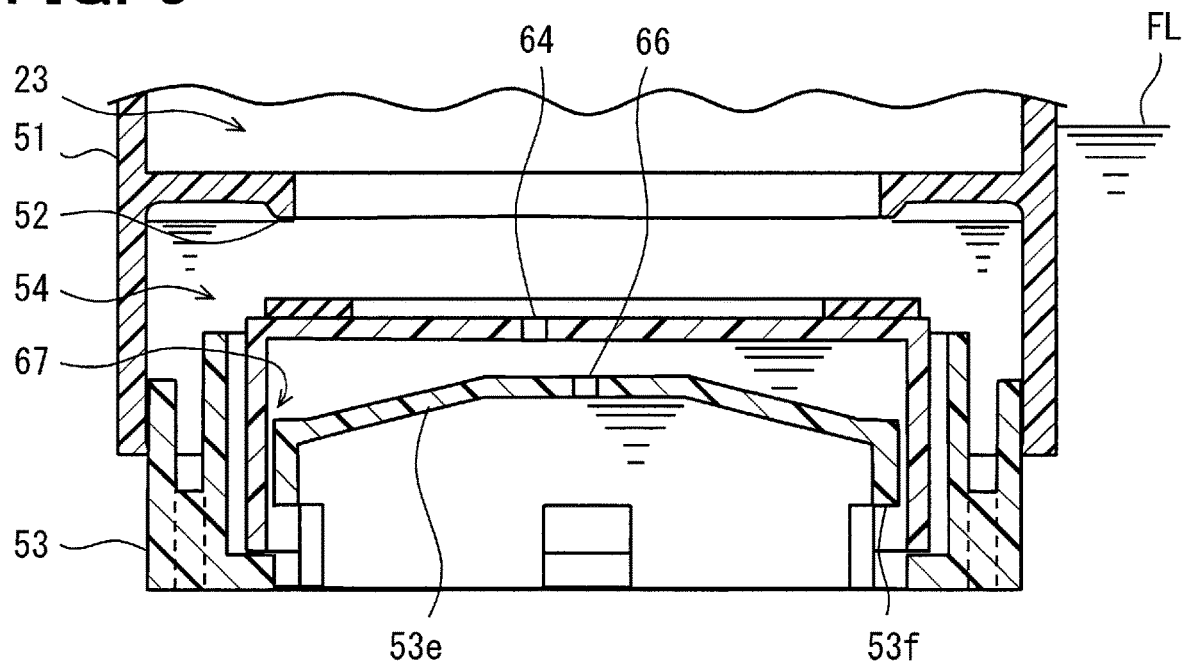
FIG. 6 is a cross sectional view showing a behavior of a valve with respect to a change in liquid level.

FIG. 6 shows a state in which the sub float valve 23 is opened below the liquid level FL. The float 54 is located below the liquid level FL in the same lowest position as in FIG. 2.

Figure 7:
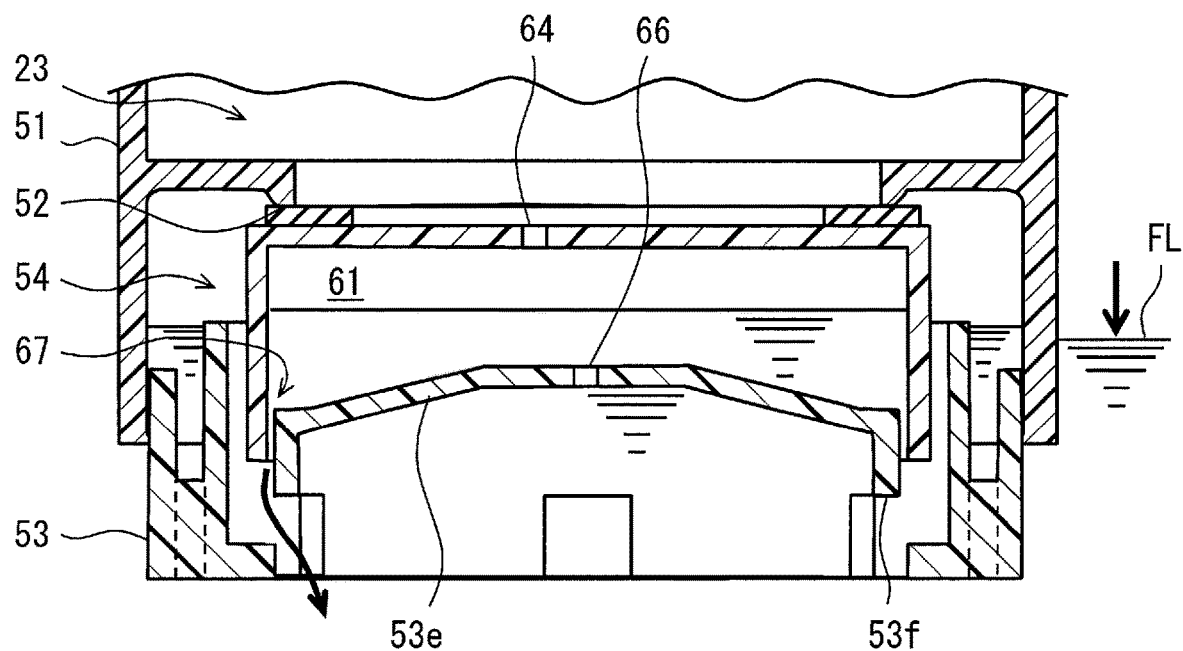
FIG. 7 is a cross sectional view showing a behavior of a valve with respect to a change in liquid level.

FIG. 7 shows a state where the liquid level FL decreases from the state of FIG. 5. In this case, the fuel in the volume chamber 61 tends to flow out from the through hole 66 and the control gap 67. At this time, the flow rate flowing through the control gap 67 is limited. As a result, a descent of the float 54 is suppressed. The float 54 descends slowly. For this reason, even if the liquid level FL fluctuates up and down violently, a sensitive reaction of the float 54 is suppressed. As a result, the collision between the second valve seat 52 and the float 54 is also suppressed.

Figure 8:
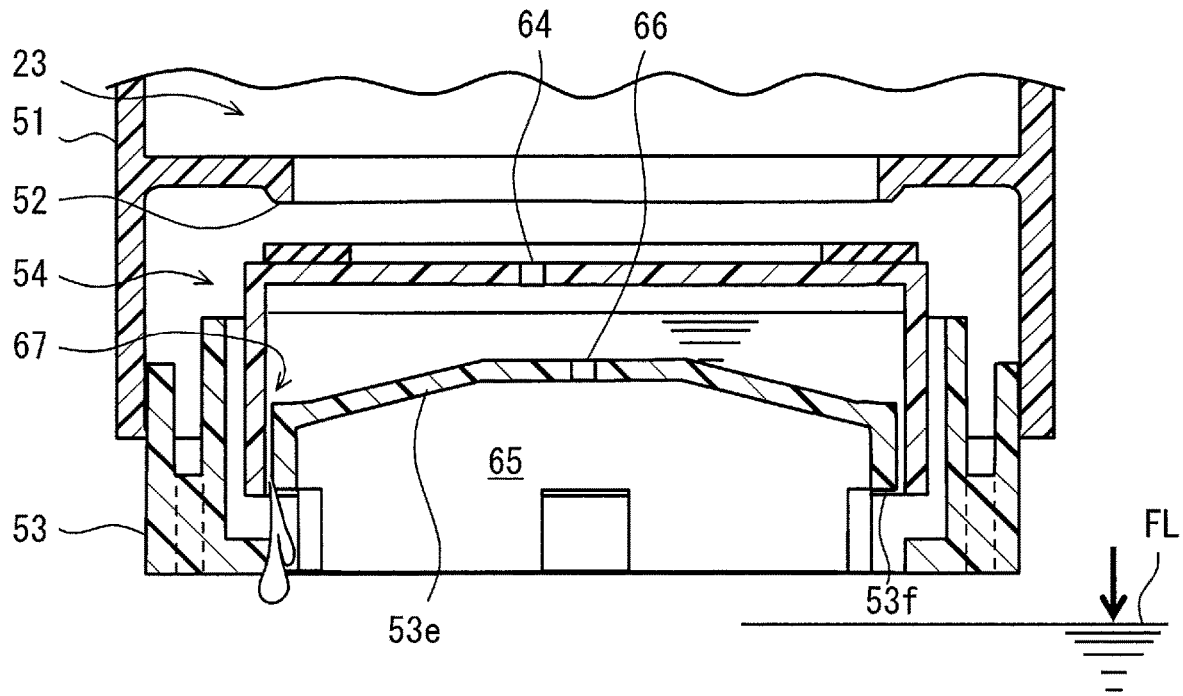
FIG. 8 is a cross sectional view showing a behavior of a valve with respect to a change in liquid level.

FIG. 8 shows a case where the liquid level FL is lowered while the fuel remains in the volume chamber 61. When the liquid level FL falls below the upper end of the opening 53f, the fuel in the gas reservoir 65 flows down all at once. For this reason, the gas reservoir 65 is filled with the gas. The fuel in the volume chamber 61 flows out from the through hole 66 and the control gap 67. Again, the fuel demonstrates a higher resistance than air and decelerates the descent speed of the float 54. At this time, the partition wall 53e that protrudes upward guides the fuel toward the control gap 67. Eventually, when all the fuel flows out of the volume chamber 61, the float 54 returns to an initial state shown in FIG. 2.

Figure 9:
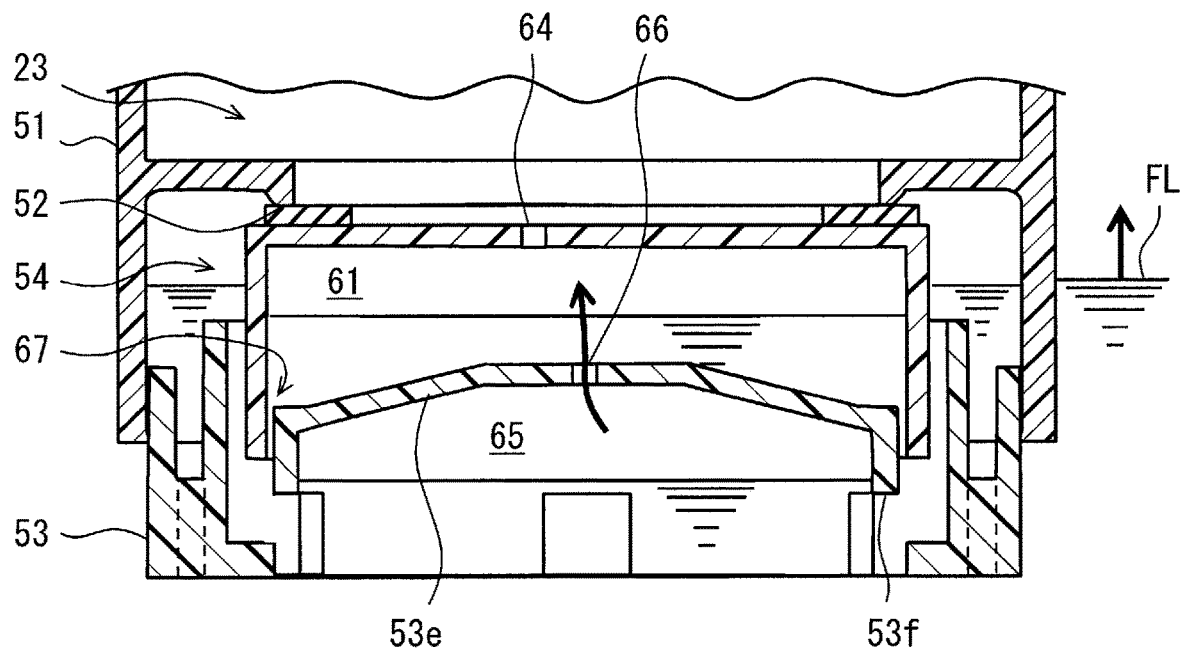
FIG. 9 is a cross sectional view showing a behavior of a valve with respect to a change in liquid level.

FIG. 9 shows a case where the liquid level FL rises again while the fuel remains in the volume chamber 61. In this case, the gas reservoir 65 is about to store the gas again. The gas in the gas reservoir 65 is gradually supplied to the volume chamber 61 through the through hole 66. Thereby, the float 54 closes the sub float valve 23 again.

Figure 10:
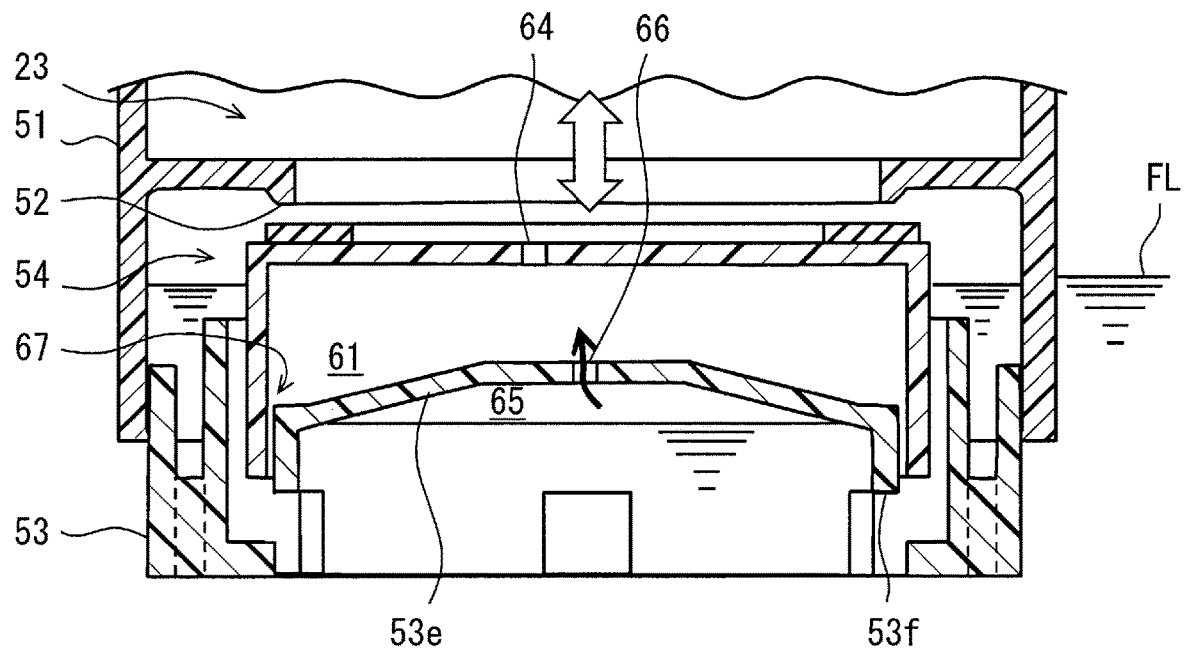
FIG. 10 is a cross sectional view showing a behavior of a valve with respect to a change in liquid level.
Figure 11:
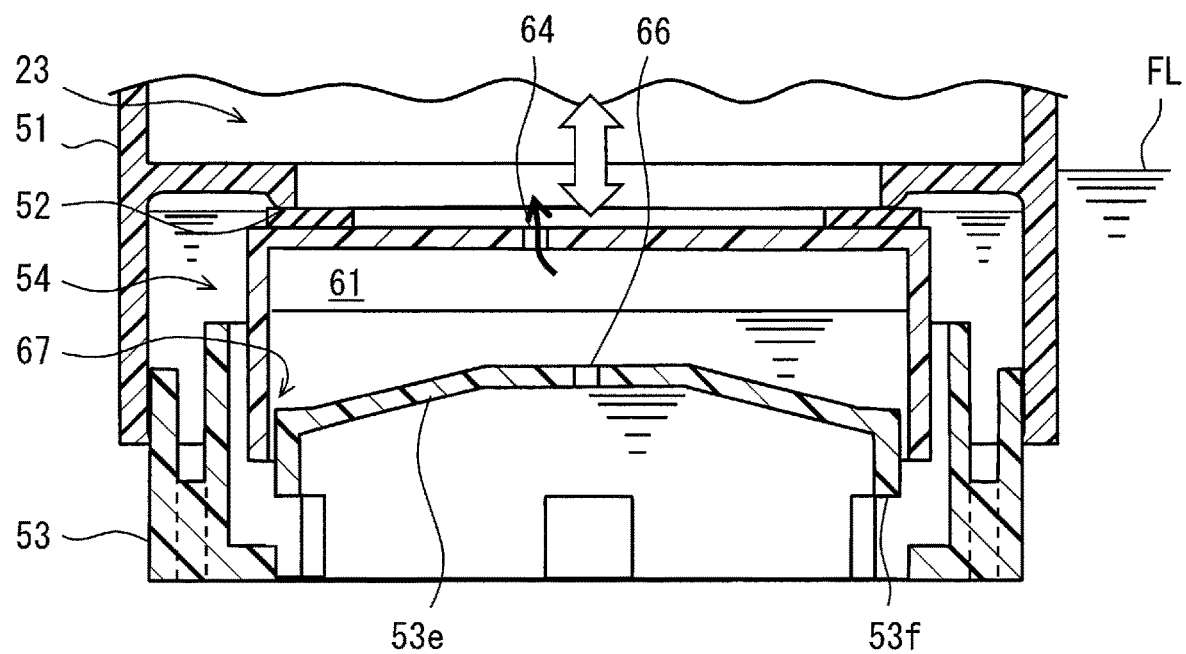
FIG. 11 is a cross sectional view showing a behavior of a valve with respect to a change in liquid level.

FIG. 10 shows a case where a negative pressure supplied from the vapor treatment device 4 fluctuates in the case of FIG. 4. In a state where the float 54 and the second valve seat 52 are slightly separated, the negative pressure supplied from the vapor treatment device 4 may fluctuate as shown by a thick arrow symbol. For example, when the rotational speed of the internal combustion engine which sucks the fuel vapor varies, the negative pressure also varies. In this case, the float 54 may collide with the second valve seat 52. When the float 54 collides with the second valve seat 52, an undesirable sound may be generated. For example, when the negative pressure decreases, the float 54 may descend. In this case, the control gap 67 restricts the flow of the fuel and the gas. Therefore, a rapid descent of the float 54 is suppressed, and even if the float 54 subsequently collides with the second valve seat 52, the energy at the time of the collision is suppressed.

FIG. 10 shows a case where the negative pressure supplied from the vapor treatment device 4 fluctuates in the case of FIG. 5. Even after the float 54 is seated on the second valve seat 52, if the negative pressure fluctuates, the float 54 may tries to be separated from the second valve seat 52. Even in this case, the control gap 67 restricts the flow of the fuel and the gas. Therefore, the rapid descent of the float 54 is suppressed, and even if the float 54 subsequently collides with the second valve seat 52, the energy at the time of the collision is suppressed.

According to the embodiment described above, the volume chamber 61 functions as a damper that restricts the valve closing motion and/or the valve opening motion of the float 54. The control gap 67 sets the outflow of the fluid from the inside to the outside of the volume chamber 61 into the first state, and sets the inflow from the outside to the inside into the second state different from the first state. For example, the control gap 67 adjusts the valve closing motion and/or the valve opening motion slower. When the valve closing motion is adjusted slower, the energy at the time of valve closing is suppressed.

When the valve opening motion is adjusted slower, a stroke amount for valve opening can be suppressed without impairing the responsiveness of the valve closing motion, and a colliding energy at the next valve closing is suppressed. As a result, it is possible to prevent the generation of undesirable sounds.

Second Embodiment

This embodiment is a modified example based on the preceding embodiment. In the above embodiment, the gas reservoir 65 is defined between the inner cylinder 53c and the partition wall 53e. Alternatively, a configuration without the gas reservoir 65 can be employed.

Figure 12:
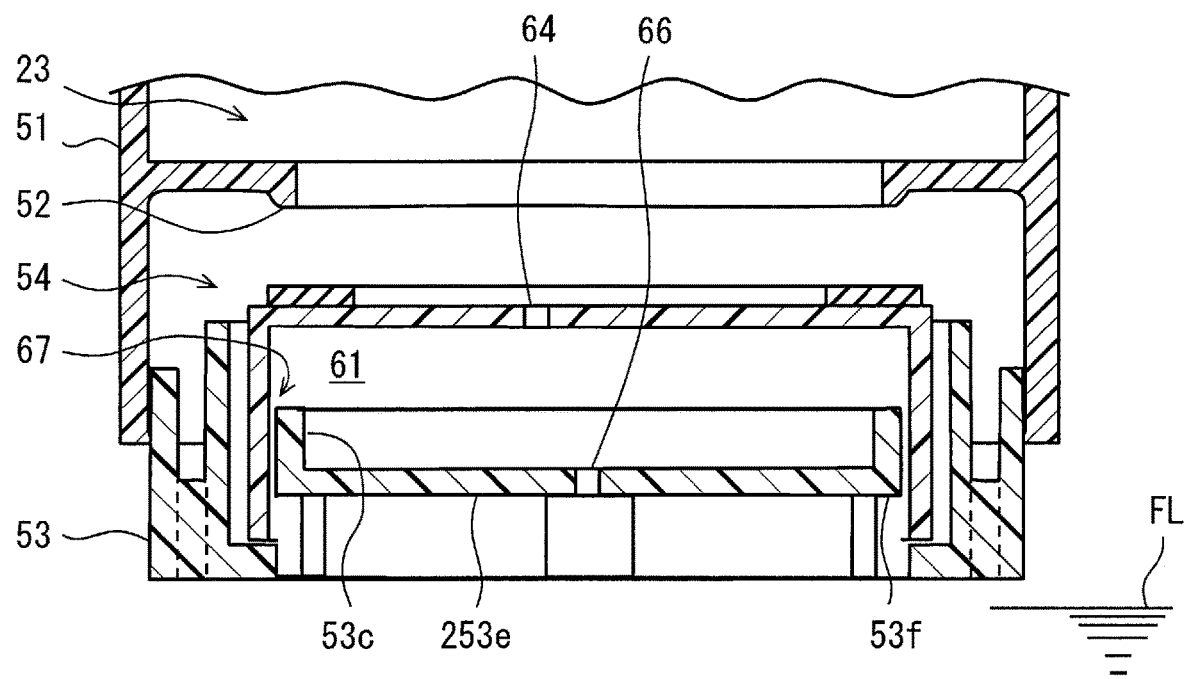
FIG. 12 is a cross sectional view showing a volume chamber according to a second embodiment.

FIG. 12 is a cross sectional view showing the sub float valve 23 as a model. A partition wall 253e is disposed at a lower end of the inner cylinder 53c. In this embodiment, there is no gas reservoir 65. Also in this embodiment, the control gap 67 restricts the fuel flow or the gas flow from the inside of the volume chamber 61 to the outside.

Other Embodiments

The disclosure in this specification, the drawings, and the like is not limited to the illustrated embodiments. The disclosure encompasses the illustrated embodiments and variations thereof by those skilled in the art. For example, the disclosure is not limited to the parts and/or combinations of elements shown in the embodiments. The disclosure may be implemented in various combinations. The disclosure may have additional parts that may be added to the embodiment. The disclosure encompasses omissions of parts and/or elements of the embodiments. The disclosure encompasses replacement or combination of parts and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

In the above embodiment, the damper mechanism is disposed on the sub float valve 23 of the so called full tank control valve. Alternatively, the main float valve 21 may be provided with a damper mechanism. In addition, when a single float valve is provided, a damper mechanism may be provided for the single float valve.

In the above embodiment, the behavior of the float and the opening and closing of the valve mechanism are in a fixed relationship. That is, the up and down of the float corresponds to the closing and opening of the valve mechanism. On the other hand, the up and down of the float may correspond to the opening and closing of the valve mechanism. Further, the cylinder and the piston may be provided in reverse. For example, in the above embodiment, the fixed piston disposed on the third case 53 and the movable cylinder disposed on the float 54 are relatively movable. Alternately, a fixed cylinder disposed on the third case 53 and a movable piston disposed on the float 54 may be relatively movable. In the above embodiment, a piston in a circular cylindrical shape is used. On the other hand, a columnar piston may be used.

In the above embodiment, the control gap 67 is disposed between the inner cylinder 53c as the fixed cylinder and the outer wall of the first member 54a as the movable piston. Alternatively, a sealing mechanism may be disposed between the inner cylinder 53c and the outer wall. For example, a rubber O-ring that prevents outflow of the gas and the liquid may be disposed.

What is claimed is:
1. A ventilation control valve for a fuel tank, the ventilation control valve being disposed in a ventilation passage communicating an inside and an outside of the fuel tank, the ventilation control valve comprising:
  a valve mechanism which has a float being capable of floating and moving up and down on a liquid level of a fuel, and which switches a passage cross sectional area of the ventilation passage in conjunction with the float into an open state and a restricted state in which
the passage cross sectional area is restricted than the
open state;
a volume chamber in which volume changes in accordance with a vertical movement of the float; and
a flow rate adjusting mechanism which sets an outflow of
a fluid from an inside to an outside of the volume
chamber in a first state, and which sets an inflow from
the outside to the inside in a second state different from
the first state, wherein
the volume chamber includes:
a fixed piston disposed on a case; and
a movable cylinder disposed on the float and movably
accommodating the fixed piston,
the float has a through hole which gradually reduces a
buoyancy of the float; and
the through hole on the gloat opens at a downstream side
of the valve mechanism on the ventilation passage.

2. The ventilation control valve claimed in claim 1, wherein
the flow rate adjusting mechanism includes a control gap
provided between the fixed piston and the movable
cylinder.

3. The ventilation control valve claimed in claim 1, wherein
the fixed piston includes:
a gas reservoir which stores gas; and
a through hole which supplies the gas from the gas
reservoir to the volume chamber.

4. The ventilation control valve claimed in claim 1, wherein
the flow rate adjusting mechanism restricts the outflow of
the fuel from the inside to the outside rather than the
outflow of the gas from the inside to the outside.

5. A ventilation control valve for a fuel tank, the ventilation control valve being disposed in a ventilation passage communicating an inside and an outside of the fuel tank, the ventilation control valve comprising:
a valve mechanism which has a float being capable of
floating and moving up and down on a liquid level of
a fuel, and which switches a passage cross sectional
area of the ventilation passage in conjunction with the
float into an open state and a restricted state in which
the passage cross sectional area is restricted than the
open state;
a volume chamber in which volume changes in accordance with a vertical movement of the float;
a flow rate adjusting mechanism which sets an outflow of
a fluid from an inside to an outside of the volume
chamber in a first state, and which sets an inflow from
the outside to the inside in a second state different from
the first state;
a gas reservoir which stores gas; and
a through hole which penetrates from the gas reservoir to
the volume chamber and supplies the gas from the gas
reservoir to the volume chamber, wherein
the float has a through hole which gradually reduces a
buoyancy of the float, and
the through hole on the float opens at a downstream side
of the valve mechanism on the ventilation passage.

6. The ventilation control valve claimed in claim 5, wherein
the flow rate adjusting mechanism includes
a control gap provided between a cylindrical wall disposed on the float and a cylindrical wall disposed on a
case.

7. The ventilation control valve claimed in claim 5, wherein
the flow rate adjusting mechanism restricts the outflow of
the fuel from the inside to the outside rather than the
outflow of the gas from the inside to the outside.

8. A ventilation control valve for a fuel tank, the ventilation control valve being disposed in a ventilation passage communicating an inside and an outside of the fuel tank, the ventilation control valve comprising:
a valve mechanism which has a float being capable of
floating and moving up and down on a liquid level of
a fuel, and which switches a passage cross sectional
area of the ventilation passage in conjunction with the
float into an open state and a restricted state in which
the passage cross sectional area is restricted than the
open state;
a volume chamber in which volume changes in accordance with a vertical movement of the float; and
a flow rate adjusting mechanism which sets an outflow of
a fluid from an inside to an outside of the volume
chamber in a first state, and which sets an inflow from
the outside to the inside in a second state different from
the first state, wherein
the float has a through hole which gradually reduces a
buoyancy of the float, and
the flow rate adjusting mechanism includes
a control gap provided between a cylindrical wall disposed on the float and a cylindrical wall disposed on a
case.

9. The ventilation control valve claimed in claim 8, further comprising:
a case which is in a cylindrical shape, defines a ventilation
passage communicating the inside and the outside of
the fuel tank, has an opening for introducing the fuel at
a lower portion, and defines an air chamber in the fuel
tank, wherein
the float is responsive to a liquid level of the fuel inside
the case.

10. The ventilation control valve claimed in claim 8, wherein
the flow rate adjusting mechanism restricts the outflow of
the fuel from the inside to the outside rather than the
outflow of the gas from the inside to the outside.

11. A ventilation control valve for a fuel tank, the ventilation control valve being disposed in the ventilation passage communicating an inside and an outside of the fuel tank, the ventilation control valve comprising:
a valve mechanism which has a float being capable of
floating and moving up and down on a liquid level of
a fuel, and which switches a passage cross sectional
area of the ventilation passage in conjunction with the
float into an open state and a restricted state in which
the passage cross sectional area is restricted than the
open state;
a volume chamber in which volume changes in accordance with a vertical movement of the float; and
a flow rate adjusting mechanism which sets an outflow of
a fluid from an inside to an outside of the volume
chamber in a first state, and which sets an inflow from
the outside to the inside in a second state different from
the first state, wherein
the float has a through hole which gradually reduced a
buoyancy of the float, and
the through hole on the float opens at a downstream side
of the valve mechanism on the ventilation passage.

12. The ventilation control valve claimed in claim 11, wherein the flow rate adjusting mechanism includes a control gap provided between a cylindrical wall disposed on the float and a cylindrical wall disposed on a case.

13. The ventilation control valve claimed in claim 11, further comprising:

a case which is in a cylindrical shape, defines a ventilation passage communicating the inside and the outside of the fuel tank, has an opening for introducing the fuel at a lower portion, and defines an air chamber in the fuel tank, wherein the float is responsive to a liquid level of the fuel inside the case.

14. The ventilation control valve claimed in claim 11, wherein the flow rate adjusting mechanism restricts the outflow of the fuel from the inside to the outside rather than the outflow of the gas from the inside to the outside.

15. A ventilation control valve for a fuel tank, the ventilation control valve being disposed in the ventilation passage communicating an inside and an outside of the fuel tank, the ventilation control valve comprising:

a valve mechanism which has a float being capable of floating and moving up and down on a liquid level of a fuel, and which switches a passage cross sectional area of the ventilation passage in conjunction with the float into an open state and a restricted state in which the passage cross sectional area is restricted than the open state;

a volume chamber in which volume changes in accordance with a vertical movement of the float; and a flow rate adjusting mechanism which sets an outflow of a fluid from an inside to an outside of the volume chamber in a first state, and which sets an inflow from the outside to the inside in a second state different from the first state, wherein the volume chamber includes:

a fixed piston disposed on a case; and a moveable cylinder disposed on the float and moveably accommodating the fixed piston, the float has a through hole which gradually reduced a buoyancy of the float, and the flow rate adjusting mechanism includes a control gap provided between a cylindrical wall disposed on the float and a cylindrical wall disposed on a case.

16. A ventilation control valve for a fuel tank, the ventilation control valve being disposed in the ventilation passage communicating an inside and an outside of the fuel tank, the ventilation control valve comprising:

a valve mechanism which has a float being capable of floating and moving up and down on a liquid level of a fuel, and which switches a passage cross sectional area of the ventilation passage in conjunction with the float into an open state and a restricted state in which the passage cross sectional area is restricted than the open state;

a volume chamber in which volume changes in accordance with a vertical movement of the float; and a flow rate adjusting mechanism which sets an outflow of a fluid from an inside to an outside of the volume chamber in a first state, and which sets an inflow from the outside to the inside in a second state different from the first state;

a gas reservoir which stores gas; and a through hole which penetrates from the gas reservoir to the volume chamber and supplies the gas from the gas reservoir to the volume chamber, wherein the float has a through hole which gradually reduces a buoyancy of the float, and the flow rate adjusting mechanism includes a control gap provided between a cylindrical wall disposed on the float and a cylindrical wall disposed on a case.

* * * * *